(12) United States Patent
Linglet et al.

(10) Patent No.: US 7,338,278 B2
(45) Date of Patent: Mar. 4, 2008

(54) COOLING SYSTEM FOR COOLING A ROTARY MOUNT, A ROTARY MOUNT INCLUDING SUCH A SYSTEM, AND A MACHINE, IN PARTICULAR A BLOW-MOLDING MACHINE, INCLUDING SUCH A SYSTEM AND SUCH A MOUNT

(75) Inventors: Stéphane Linglet, Octeville-sur-Mer (FR); Pierre-François Langlois, Octeville-sur-Mer (FR); Nicolas Rousseau, Octeville-sur-Mer (FR)

(73) Assignee: Sidel, Octeville-sur-Mer (FR)

( * ) Notice: Subject to any disclaimer, the term of this patent is extended or adjusted under 35 U.S.C. 154(b) by 334 days.

(21) Appl. No.: 11/030,907

(22) Filed: Jan. 10, 2005

(65) Prior Publication Data

US 2006/0141091 A1     Jun. 29, 2006

(30) Foreign Application Priority Data

Dec. 29, 2004   (FR) .................................. 04 14047

(51) Int. Cl.
  *B29C 49/36*   (2006.01)
(52) U.S. Cl. ................ 425/526; 425/540; 364/317; 364/321; 364/476; 364/900
(58) Field of Classification Search ................ 384/317, 384/321, 476, 900; 425/526, 540; 374/153
See application file for complete search history.

(56) References Cited

U.S. PATENT DOCUMENTS

| | | | | |
|---|---|---|---|---|
| 1,302,641 A * | 5/1919 | de Lavaud | .................. | 384/476 |
| 2,352,206 A * | 6/1944 | Kendall | ..................... | 384/476 |
| 3,305,891 A * | 2/1967 | Nozaki | ..................... | 425/540 |
| 3,365,748 A * | 1/1968 | Cote | .......................... | 425/526 |
| 4,323,286 A | 4/1982 | Vohr | | |
| 4,402,559 A * | 9/1983 | Shibata et al. | ............. | 384/476 |
| 4,602,874 A * | 7/1986 | Neugebauer | ................ | 384/476 |
| 4,698,012 A * | 10/1987 | Shelby et al. | ............... | 425/526 |
| 5,192,139 A * | 3/1993 | Hiramoto et al. | ........... | 384/476 |
| 5,433,525 A | 7/1995 | El-Ibiary | | |
| 5,642,105 A * | 6/1997 | Duffy et al. | ................ | 384/448 |
| 5,863,571 A | 1/1999 | Santais et al. | | |
| 6,293,703 B1 * | 9/2001 | Date | ......................... | 384/476 |
| 7,018,105 B2 * | 3/2006 | Oka | .......................... | 384/448 |

FOREIGN PATENT DOCUMENTS

DE   17 50 578 A1   12/1972
GB   2 136 886 A    9/1984

OTHER PUBLICATIONS

Patent Abstracts of Japan, vol. 2003, No. 12, Dec. 5, 2003 & JP 2004 092878 A, Mar. 25, 2004, abstract.

* cited by examiner

*Primary Examiner*—Robert B. Davis
(74) *Attorney, Agent, or Firm*—Sughrue Mion, PLLC

(57) ABSTRACT

The invention provides a cooling system for cooling a rotary mount (2) comprising two rings (4, 7) capable of rotating relative to each other, each ring having a raceway, the mount further comprising a bearing device constituted by rolling bodies interposed between the two raceways, the cooling system being characterized in that it comprises at least one circuit for passing a cooling fluid, which circuit is pressed against one of the two rings (4, 7) of said mount. It also provides a rotary mount including such a system, and a machine, in particular a blow-molding machine, including such a mount.

9 Claims, 4 Drawing Sheets

COOLING SYSTEM FOR COOLING A ROTARY MOUNT, A ROTARY MOUNT INCLUDING SUCH A SYSTEM, AND A MACHINE, IN PARTICULAR A BLOW-MOLDING MACHINE, INCLUDING SUCH A SYSTEM AND SUCH A MOUNT

The invention relates to the technical field of rotary machines, and particularly but not exclusively, to machines for blowing receptacles, such as blow-molding machines.

The invention is of particular advantage for rotary machines of the above-mentioned type that comprise a carousel carried by a rotary mount.

BACKGROUND OF THE INVENTION

In general, a rotary mount comprises two rings that can be rotated relative to each other, each ring having a raceway, and the mount further comprises bearing means constituted by rolling bodies or members (such as balls or wheels) interposed between the two raceways, and a device for holding together the elements making up the mount and for preventing it coming apart, while allowing the two rings to rotate relative to each other.

Blow-molding machines usually include such a rotary mount. Such blow-molding machines are conventionally provided with a plurality of mold units carried by a carousel which is rotatable about an axis that is substantially vertical. For this purpose, one of the rings is connected to the frame of the machine, and the carousel is carried by the other ring. Thus, the carousel can rotate relative to the frame. The ring connected to the frame is said to be the stationary ring, and the other ring is said to be the rotary ring. The rotary ring, and thus the carousel, is rotated by a motor, generally not directly, but via gear and/or belt mechanisms.

The Applicant has found that relatively modest and localized heating of the mount in a blow-molding machine occurs during ordinary use of such machines.

For a mount having a diameter of 1800 millimeters (mm) and rotating at 30 revolutions per minute (rpm), the rotating mass being 18 metric tonnes (T), the Applicant has observed localized heating of about 25° C.

That phenomenon has remained unnoticed until now, doubtless in part because the rotary mount is located in the core of a machine that is very compact, said machine having very many members moving at high speed when the machine is in operation.

The phenomenon has doubtless also remained unobserved because it is of very small amplitude, localized heating of about 25° C. being very likely to pass unnoticed in the core of a machine having numerous members that are dissipating heat, particularly in an industrial environment.

The Applicant suggests that such localized and modest heating of the rotary mount might nevertheless lead to significant consequences, such localized heating causing the mount to expand very slightly, which can lead to small variations in operating clearances, and to premature wear of certain parts.

On the basis of this discovery of localized and modest heating, and assuming that there exists correlation between said modest rise in temperature and certain variations in the operating clearances of the machine, the Applicant has set out to mitigate this apparent technical problem.

The Applicant has thus devised means enabling said localized heating to be controlled, in order to reduce it or even eliminate it, so as to reduce undesirable phenomena such as operating clearances appearing in the vicinity of certain machine parts, with such means being suitable for putting into place on existing machines. Initially, several approaches did not give satisfaction.

A first approach consisted in providing the moving ring with fins. A second approach consisted in using air to spray oil onto the bearing device: that approach turned out to be incompatible with machines for blow-molding receptacles since it led to unwanted pollution of the machine, which pollution could reach the receptacles, which is unacceptable.

SUMMARY OF THE INVENTION

An object of the invention is to remedy the drawbacks of known mounts, by proposing firstly a system that is effective, and that is compatible with machines for blow-molding receptacles, and secondly a mount provided with the system.

Another object of the invention is to provide a blow-molding machine including a rotary mount provided with the system.

To this end, in a first aspect, the invention provides a cooling system for cooling a rotary mount comprising two rings capable of rotating relative to each other, each ring having a raceway, the mount further comprising a bearing device constituted by rolling bodies interposed between the two raceways, the cooling system comprising at least one circuit for passing a cooling fluid, which circuit is pressed against one of the two rings of said mount.

According to another characteristic, the system includes means for measuring the temperature of the mount and means for controlling the flow of cooling fluid as a function of the difference between the temperature of the mount and a reference temperature, e.g. ambient temperature.

In an embodiment, a circuit for passing cooling fluid comprises at least two stages. It is thus possible to cool the ring of the mount with which it is associated over its full height, given that certain mounting rings are tall.

Preferably, the circuit for passing cooling fluid is substantially annular, so as to fit closely to the ring against which it is pressed.

Advantageously, each stage comprises arcuate duct elements, each arcuate element of a given stage being in cooling fluid connection at a first one of its two ends with another arcuate element of the same stage, and being in cooling fluid connection via its other end with means for injecting or removing cooling fluid. It is thus possible to fit mounts of different diameters by using arcuate elements of relatively short length, and, where necessary, curving these elements by hand or by using a portable tool, in order to match them to the radius of curvature of the ring against which they are to be placed.

Advantageously, the cooling fluid is circulated in two opposite directions from a given stage of the circuit to the stage which is contiguous therewith. This counterflow configuration enables heat transfer to be performed more uniformly.

Advantageously, the circuit for passing cooling fluid is made up of arcuate duct elements that are substantially identical, connected to one another, and connected to means for removing and injecting cooling fluid. The system can thus be mass-produced, e.g. by shaping/curving tubes made of a metal alloy such as an aluminum alloy.

In order to further facilitate heat transfer by conduction and avoid the presence of films of air between the cooling duct and the rotary mount, a semi-liquid heat-transfer substance is advantageously placed between the arcuate duct element and said rotary mount against which the elements are placed. This semi-liquid substance of high thermal conductivity could be applied, for example, by means of a spray gun prior to clamping the arcuate duct elements against the rotary mount, alternatively, it is possible to use a double-sided component.

Advantageously, the cooling fluid is water. Water is compatible with a food environment, such as that of certain machines used for fabricating or conveying articles made of polymers, in particular machines for blowing bottles, and does not lead to any pollution problems in the event of accidental leakage; in addition, the cooling effect of water is sufficient for compensating the temperatures reached by the rotary mounts of blow-molding machines; finally, machines for blowing receptacles generally already have water feed circuits, e.g. for cooling the molds, so the mount cooling circuits can be connected thereto.

In an advantageous embodiment of a blow-molding machine fitted with a mount comprising a stationary ring connected to the frame of the machine and a carousel carried by the other or "rotary" ring, the circuit for passing cooling fluid comprises arcuate duct elements pressed against the stationary ring of said mount. Under such circumstances, there is no need to use a rotary joint for feeding cooling fluid to the circuit for passing said fluid.

BRIEF DESCRIPTION OF THE DRAWINGS

Other objects and advantages of the invention appear from the following description of embodiments, which description is given with reference to the accompanying drawings, in which.

DETAILED DESCRIPTION

Figure 1:
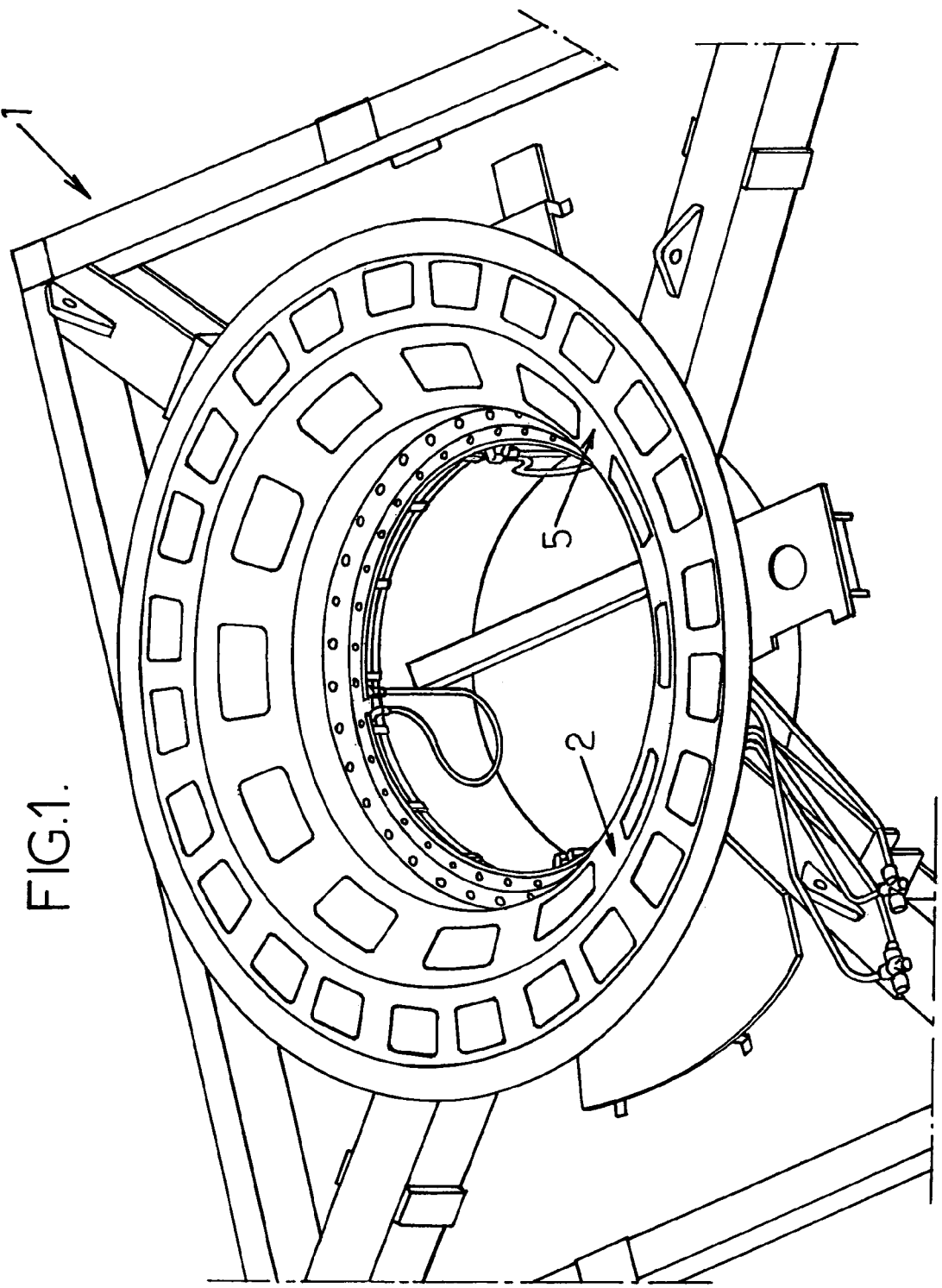
FIG. 1 is a perspective view of an embodiment of the invention, FIG. 1 also showing parts of a machine frame, with the rotary mount being mounted on that frame.
Figure 4:
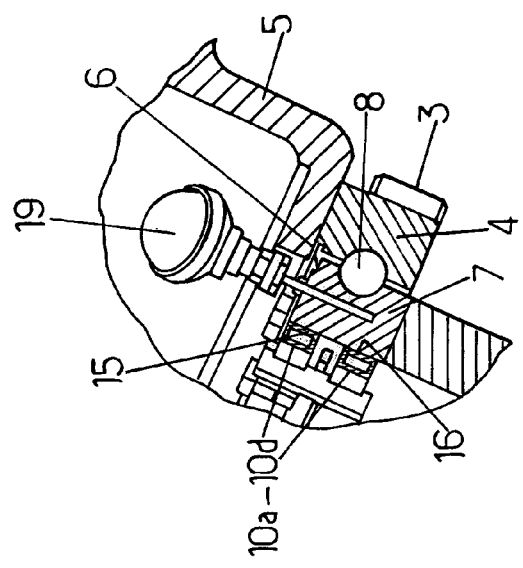
FIG. 4 is a section view of the rotary mount shown in FIG. 3.
Figure 3:
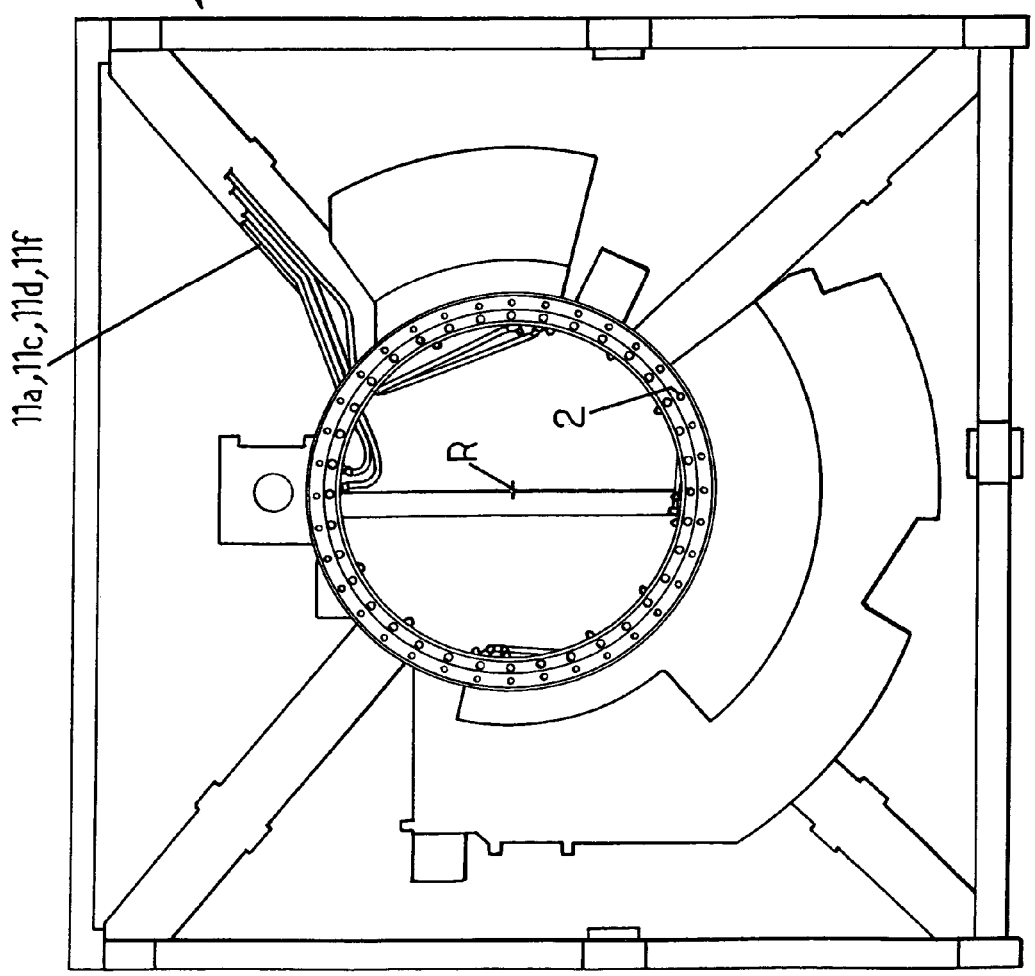
FIG. 3 is a plan view corresponding to FIG. 1, this figure showing in particular the disposition of means for measuring temperature close to the rolling bodies of the rotary mount.

Reference is made initially to FIGS. 1 and 4.

The frame 1 of a machine, e.g. a machine for blow-molding receptacles, is shown in part in FIG. 1 in the form of a machine-welded assembly of box girders and H or I beams.

The frame 1 carries a rotary mount 2.

The rotary mount 2 has an outer set of teeth 3 (see FIG. 4) carried by a rotary ring 4, in this case the outer ring of the mount. A rotary mass 5 in the form of a perforated cup is mounted on the rotary ring 4, e.g. by means of blind or through fastener holes that may be smooth or tapped. The cup carries various members of the machine (not shown) such that the assembly constitutes a carousel. By way of illustration, on one of the Applicant's machines, the rotary mass 5 fitted with said members (molds, clamps, . . . ) can weigh about 18 T, for a carousel (and thus a rotary ring 4) that rotates at a speed of about 30 rpm.

Gaskets 6 are placed between the outer ring 4 and a ring 7 of the mount 2, which ring may be secured to the frame 1 of the machine. These gaskets 6 may be made of nitrile elastomer.

As shown in FIG. 4, a bearing device 8 constituted by rolling bodies, such as balls or steel rolling wheels, is interposed between the two rings so as to enable one ring to rotate relative to the other. More precisely, the rolling bodies are disposed between two respective zones of each ring that constitutes respective raceways of profile that matches the profile of the rolling bodies. Thus, when the rolling bodies are balls (FIG. 4), then the raceways are in the form of annular grooves having facing radial sections that are circularly arcuate.

Where appropriate, the mount 2 may be greased via radial greasing holes and filler plugs (not shown).

In conventional manner, the rings 4 and 7 can be made of carbon steel, stainless steel, structurally-hardened steels or alloys, or of special steels for quenching in a controlled atmosphere, as a function in particular of operating conditions.

The raceways are subjected to quenching by induction or by flame, and it is also possible to apply surface treatment to the teeth, e.g. by cementation or plasma nitriding, depending on the forces that are to be applied.

For example, on a blow-molding machine, the rotary mount 2 is subjected to axial loads acting in a direction parallel to the axis of rotation R of the mount 2, and also to radial loads, to overturning moments, and to pivot torques. The rotary mount 2 transmits the forces to the stationary frame 1.

Reference is now made more particularly to FIGS. 2 to 6.

In accordance with the invention, the mount 2 is provided with a circuit 9 for passing a cooling fluid that enables controlled cooling to be performed.

In the embodiment shown, the circuit 9 for passing cooling fluid is placed and pressed against the inside surface of the inner ring 7 of the mount 2, which ring constitutes the stationary ring. As explained below, this presents the advantage of not requiring rotary fluid couplings to be used between the circuit 9 and a circuit for feeding fluid to the machine. In other embodiments (not shown), it is quite possible for the circuit to be placed and pressed against the rotary ring 4 (in this case the inner ring) of the rotary mount 2; it is also possible to provide both rings with a respective circuit for passing cooling fluid.

Figure 2:
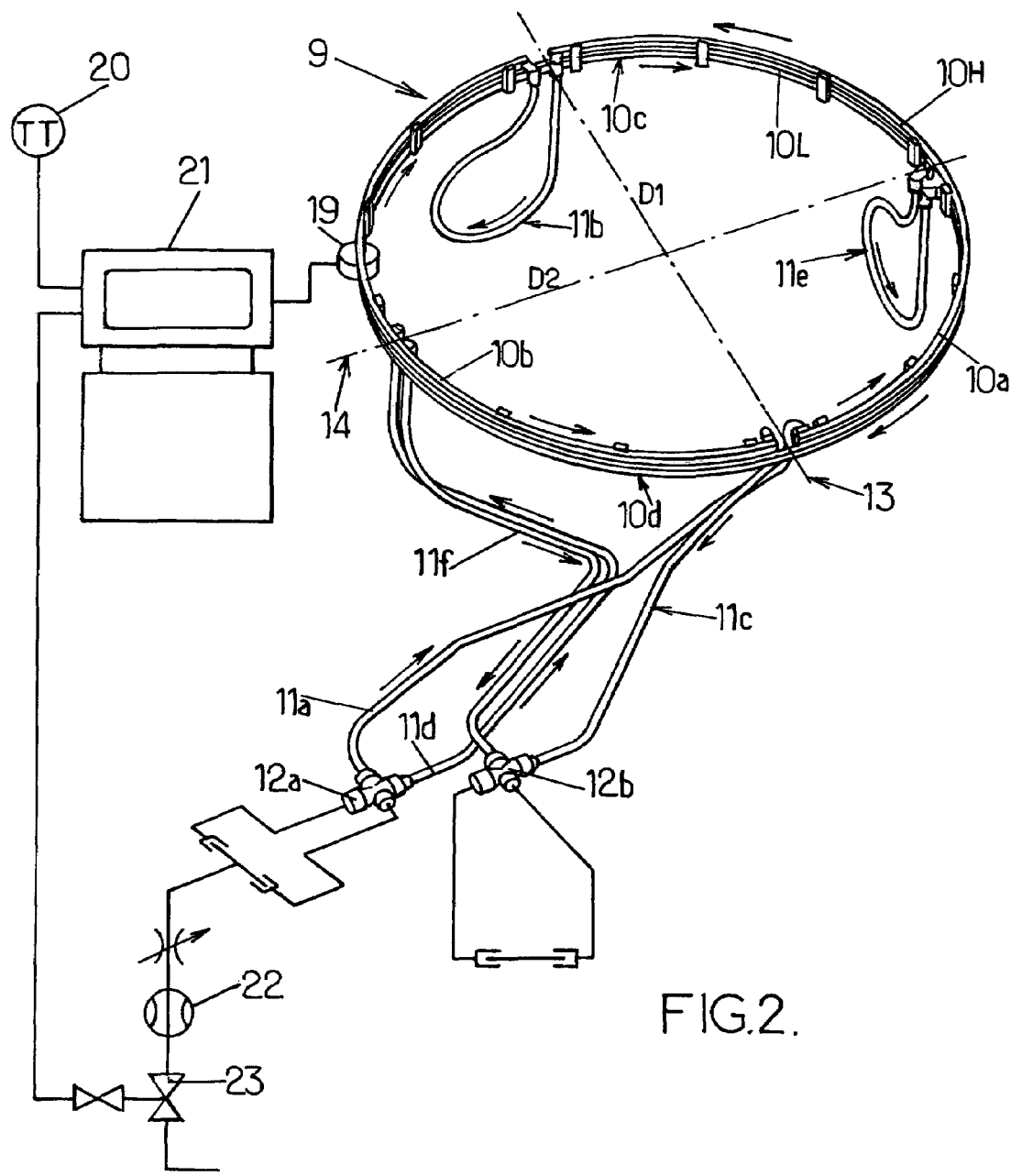
FIG. 2 is a diagram showing an arrangement of ducts for circulating cooling fluid of the kind implemented in the embodiment of FIG. 1, together with a control and regulator arrangement.

As shown in FIG. 2, and preferably, the circuit 9 for passing cooling fluid is distributed over the ring 2 as a plurality of fluid-passing stages, in this case two stages 10H to 10L, each comprising at least one arcuate duct element 10a, 10b, 10c, 10d in which a cooling fluid conveyed by connection ducts 11a to 11f flows.

More precisely, in the embodiment shown in FIG. 2, the circuit 9 for passing cooling fluid comprises two superposed stages 10H and 10L each comprising at least two substantially identical arcuate elements (elements 10a, 10b for the first stage 10H; elements 10c, 10d for the second stage 10L) that are interconnected by connection ducts.

The ends of the arcuate elements 10a, 10b of a higher first stage 10H are placed at the end of a first diameter D1.

The ends of the arcuate elements 10c, 10d of the lower second stage 10L are placed at the ends of a second diameter D2.

This arrangement makes it possible to cool effectively a ring that presents a plurality of sections of different diameters in the vertical direction.

Naturally, the number of superposed stages could be increased, depending on the profile of the ring; for a ring that does not present any change in diameter, a single stage could be used, enabling the full height of the ring to be cooled.

In addition, the use of at least two elements connected in series per stage, although not necessary, makes it easier to install the cooling system on machines that already exist; transport is also made easier, given that the diameter of a rotary mount for a blow-molding machine may exceed a few meters.

As can be seen in FIG. 2, the cooling fluid starts from a first connection 12a such as a branch coupling with a fluid circuit (not shown) already in existence in the machine, passes via a connection duct 11a, passes into a first arcuate element 10a of the higher stage 10H, then via another connection duct 11b, then via a second arcuate element 10b of the higher stage 10H, in order to be removed via a connection duct 11c to a second connection 12b such as another branch coupling with a fluid circuit.

As can be seen in FIG. 2, the cooling fluid flows in the elements 10a, 10b in a first direction, in this case the counterclockwise direction.

Furthermore, starting from the first connection 12a, the cooling fluid passes via another connection duct 11d into a first element 10c of the lower stage 10L, through a connection duct 11e, a second arcuate element 10d of the lower stage 10L, and is then removed via a duct 11f to the second connection 12b.

As can be seen in FIG. 2, the cooling fluid flows in the elements 10c and 10d in a second direction, in this case in the clockwise direction.

Cooling fluid enters and leaves the elements 10a and 10b of the higher stage 10H via a zone 13 that is offset by about 90° relative to the zone 14 where cooling fluid enters and leaves the elements 10c and 10d of the lower stage.

By means of these dispositions, the mount is cooled more uniformly.

It should be understood that the terms "lower" and "higher" are used herein merely for reasons of clarity, and it should also be understood that in a different embodiment the cooling fluid could flow in directions opposite to those described above, with the fluid arriving via the second connection 12b and leaving via the first connection 12a.

As can be seen in FIG. 4, in one embodiment, the elements 10a to 10d are substantially rectangular in section, with a large face 15 of each section being pressed against the inner ring 7, which in this case constitutes the stationary ring of the mount 2.

A thermal gasket 16 is advantageously placed between the face 15 and the inner ring 7, e.g. in the form of a paste that is sold by the supplier Bergquist under the name GapPad® VO Ultra soft. According to the supplier, this paste has heat capacity of about 1 Joule per gram kelvin (ASTM C351) and thermal conductivity of about 1 watt per meter kelvin (ASTM D5470).

Figure 5:
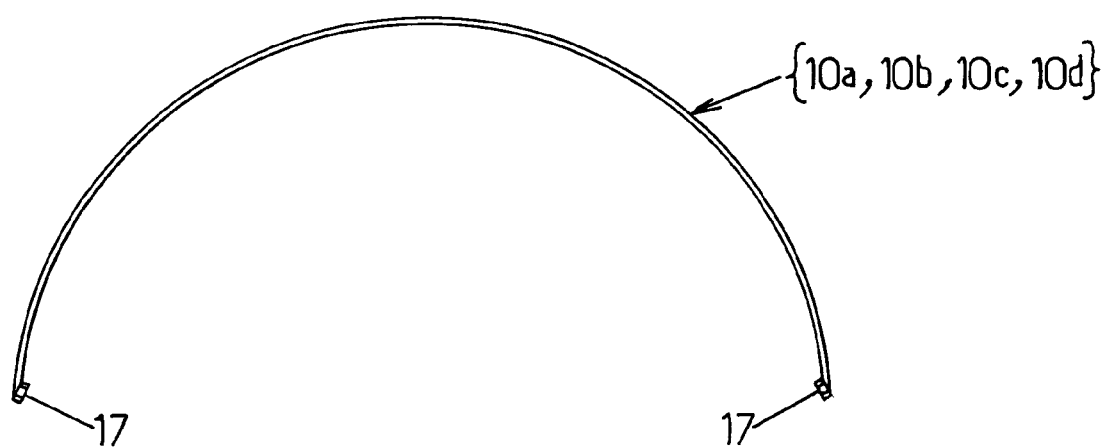
FIG. 5 is a plan view of an element of the cooling fluid circuit as used in FIG. 2.
Figure 6:
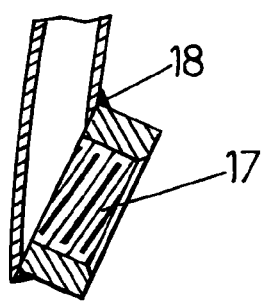
FIG. 6 is a detail view of an end portion of the element shown in FIG. 5.

As can be seen in FIGS. 5 and 6, the arcuate elements 10a, 10b, 10c, and 10d (only one of which is shown in FIG. 5), e.g. tubes of aluminum alloy having a section of 30 mm by 15 mm and a thickness of 2 mm, are provided with connection orifices 17, e.g. welded on at 18, for the purpose of connecting to the ducts 11a to 11f as shown in FIG. 2.

The temperature of the fluid circulating in the system can be regulated by means of elements described below.

Temperature-measurement means 19 for measuring the temperature of the mount 2, such as a probe or a sensor, are placed in the vicinity of the rolling bodies, as can be seen in FIG. 4. These measurement means 19 and means 20 for measuring ambient temperature, such as another probe or another sensor, are connected to a controller 21 that is also connected to a flow meter 22 of a solenoid valve 23 placed in the cooling fluid return circuit, as shown diagrammatically in FIG. 2.

The Applicant has found that regulation of the ON/OFF type applied to the flow of cooling fluid is satisfactory for cooling a rotary mount in a blow-molding machine, when the rotary mass at 30 rpm is 18 T for a mount diameter of about 1800 mm.

With such parameters, valve-open times of 5 minutes separated by valve-closed times of 10 minutes are satisfactory for cooling fluid flowing at a rate of about 0.5 cubic meters per hour ($m^3/h$) to 1.5 $m^3/h$, the cooling fluid being water at about 7° C.

The invention claimed is:

1. A machine for fabricating receptacles by blow-molding, the machine comprising a rotary mount (2) and a circuit for passing a cooling fluid, said rotary mount (2) carrying a carousel of a receptacle blow-molding machine, said mount comprising two rings (4, 7) capable of rotating relative to each other, each ring having a raceway, the mount further comprising a bearing device (8) constituted by rolling bodies interposed between the two raceways, the machine being characterized in that a cooling device is provided comprising at least one cooling circuit (9) pressed against one of the two rings (4, 7) of said mount (2), in that there are provided measurement means (19) for measuring the temperature of the mount (2), and control means (21) for controlling the flow of cooling fluid as a function of the difference between the temperature of the mount (2) and a reference temperature, the cooling circuit (9) of the mount (2) being connected to the cooling fluid circuit of the machine,
   in that the cooling circuit (9) comprises at least one stage (10H; 10L) having at least one arcuate duct element (10a, 10b; 10c, 10d); and
   in that the machine comprises at least two stages (10H; 10L), and the cooling fluid is caused to circulate in two opposite directions from a given stage of the circuit to the stage which is contiguous therewith.

2. A machine according to claim 1, characterized in that the mount (2) is provided with a stationary ring (7) connected to the structure of the machine and a ring (4) carrying a carousel, and in that the cooling device of the mount (2) comprises arcuate duct sectors (10a, 10b, 10c, 10d) pressed against the stationary ring (7) of said mount (2).

3. A machine according to claim 1, characterized in that the cooling circuit (9) is substantially annular and is made up of arcuate duct elements (10a, 10b, 10c, 10d) pressed against a ring (7) of said mount (2).

4. A machine according to claim 1, characterized in that a stage (10H; 10L) comprises at least one duct element connected via a first of its two ends to a cooling fluid inlet connection (12a), and via its other end to a cooling fluid outlet connection (12b).

5. A machine according to claim 4, characterized in that a stage (10H; 10L) comprises at least two arcuate duct elements (10a, 10b; 10c, 10d) interconnected by connection ducts (11b, 11e), one element (10a; 10c) being connected via a first connection (12a) to a fluid inlet circuit existing in the machine, one end of another element (10b; 10d) being connected via a second connection (12b) to a fluid outlet circuit existing in the machine.

6. A machine according to claim 1, characterized in that the cooling circuit (9) is formed by substantially identical arcuate duct elements interconnected and connected to cooling fluid inlet means and outlet means.

7. A machine according to claim 6, characterized in that a thermal gasket (16) is disposed between the arcuate duct elements and the ring against which said elements are pressed.

8. A machine according to claim 1, characterized in that the cooling fluid is water.

9. A machine according to claim 1, characterized in that said means (19) for measuring the temperature of the mount are constituted by a probe placed close to the rolling bodies of the bearing device (8) of the mount (2).

* * * * *